(12) United States Patent
Van Kooyk et al.

(10) Patent No.: US 6,202,444 B1
(45) Date of Patent: Mar. 20, 2001

(54) PRODUCING A GLASS OBJECT HAVING AN ENCODABLE LAYER

(75) Inventors: Raymond J. L. Van Kooyk; Johan Bosman, both of Eindoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/479,639

(22) Filed: Jan. 7, 2000

Related U.S. Application Data

(62) Division of application No. 08/878,720, filed on Jun. 19, 1997, now Pat. No. 6,037,041.

(30) Foreign Application Priority Data

Jul. 11, 1996 (EP) .................................................. 96201954

(51) Int. Cl.[7] .................................................. C03C 17/04
(52) U.S. Cl. ............................ 65/33.4; 65/33.6; 65/60.5; 65/60.6; 65/60.7; 65/60.8; 216/65; 219/121.6; 427/193; 427/199
(58) Field of Search ..................................... 65/33.2, 33.4, 65/33.6, 60.5, 60.6, 60.7, 60.8; 219/121.6; 216/65; 427/193, 199, 201, 203, 204

(56) References Cited

U.S. PATENT DOCUMENTS

| | | | |
|---|---|---|---|
| 4,323,755 | * | 4/1982 | Nierenberg . |
| 4,327,283 | * | 4/1982 | Heyman et al. . |
| 4,515,867 | * | 5/1985 | Bleacher et al. . |
| 4,791,267 | * | 12/1988 | Yokoyama et al. . |
| 5,021,112 | * | 6/1991 | Breger . |
| 5,111,344 | * | 5/1992 | Robinson, Jr. . |
| 5,393,465 | * | 2/1995 | Drozdyk et al. . |
| 5,683,786 | * | 11/1997 | Kavanaugh . |

FOREIGN PATENT DOCUMENTS 2-131931 * 5/1990 (JP) .

* cited by examiner

*Primary Examiner*—Sean Vincent
(74) *Attorney, Agent, or Firm*—Norman N. Spain

(57) ABSTRACT

A method of providing an encodable layer on a glass object and on the resultant product. Said layer is formed by providing a paste containing glass frit, pigment and a binder, on the hot glass. As a result, the glass frit melts, causing the pigment to adhere to the glass object. The binder, which is used to render the paste spreadable, disappears from the mixture.

3 Claims, 1 Drawing Sheet

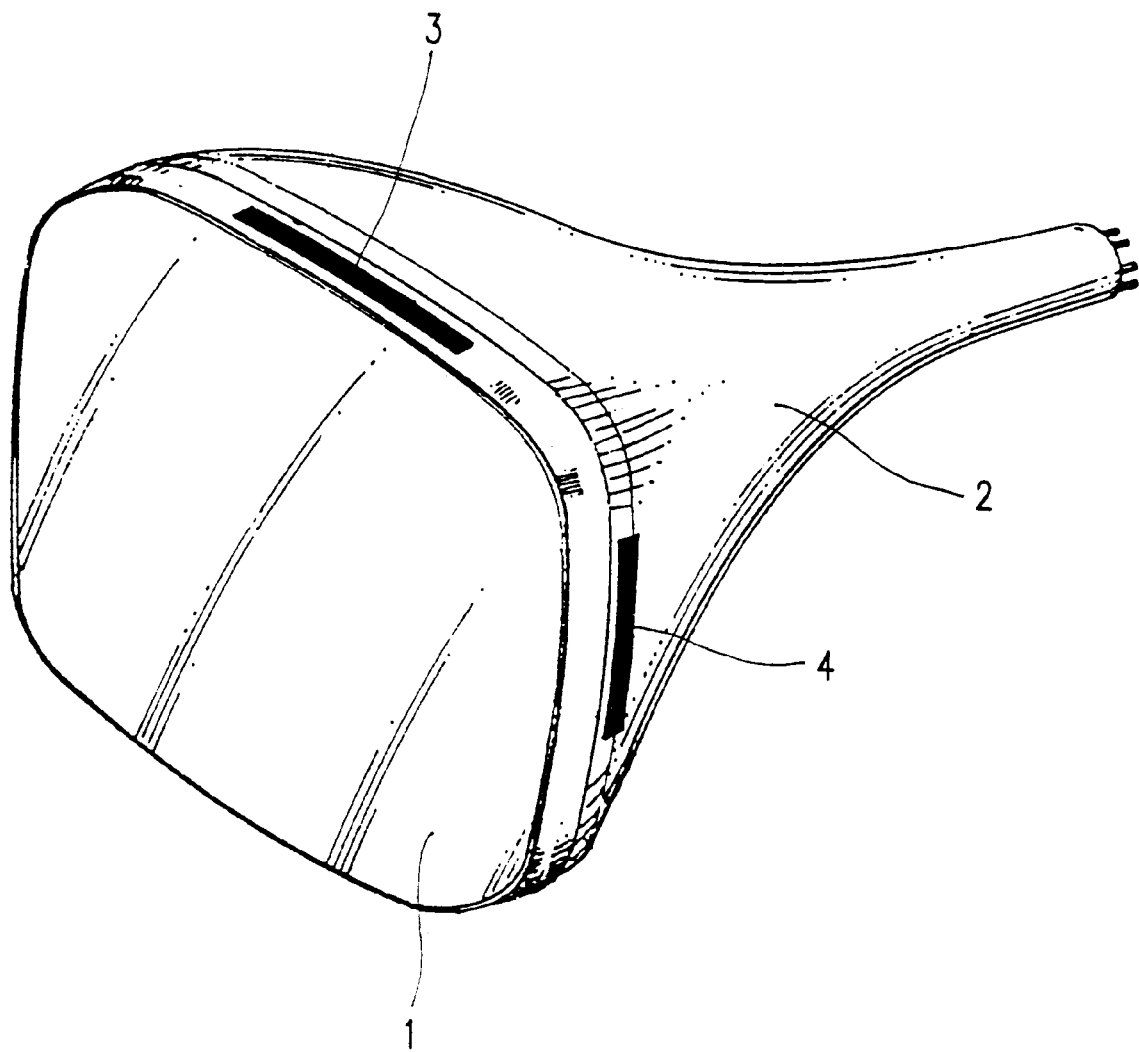

PRODUCING A GLASS OBJECT HAVING AN ENCODABLE LAYER

CROSS REFERENCE TO RELATED APPLICATIONS

This is a divisional of application Ser. No. 08/878,720, filed Jun. 19, 1997, now U.S. Pat. No. 6,037,041.

BACKGROUND OF THE INVENTION

The invention relates to a glass object having an encodable layer, as well as to a method of providing a layer on a glass object. The invention further relates to a method of encoding a glass object. Said glass object may be, for example, a front panel of a display tube or a cone of a cathode ray tube.

In general, glass is encoded by providing it with paper stickers on which the code is printed. A disadvantage of these paper stickers is that they cannot withstand processes in which the glass is subjected to heat, because they are burned at high temperatures.

OBJECTS AND SUMMARY OF THE INVENTION

It is an object of the invention to provide a glass object having an encodable label which is resistant to high temperatures. To this end, the object in accordance with the invention is characterized in that it at least comprises a layer which includes glass and pigment. A layer in accordance with the invention can be made, for example, by providing a paste comprising a binder, pigment and glass frit onto hot glass (the glass for example being at a temperature between 400° C. and 600° C., in particular at a temperature of approximately 500 degrees). As the label is resistant to high temperatures, it can be provided early in the production process of the glass product, so that said product can be monitored during the entire process and after said process.

These and other aspects of the invention will be apparent from and elucidated with reference to the embodiments described hereinafter.

In the drawing:

BRIEF DESCRIPTION OF THE DRAWINGS

The sole FIGURE shows a display tube on which labels are provided.

DESCRIPTION OF THE PREFERRED EMBODIMENTS

The FIGURE shows a display tube comprising a front panel (1) and a cone (2), which are both provided with a label. In this case, a label is provided on the side face of the front panel and on the side face of the large end portion of the cone. However, the labels may alternatively be provided in other locations. The size of a label can be such that it can contain information from the manufacturer and from the customer. Thus, both the manufacturer and the customer can provide their codes on the same label. The manufacturer can also provide a separate label for use by the customer.

In accordance with the invention, a glass object, for example a front panel of a display tube, is provided, while it is still hot (at a temperature of e.g. between 400° C. and 600° C., in particular approximately 500° C.), with a paste by means of e.g. a roller. Said paste hardens to form a label in which a code can be provided at any time (for example by local ablation by means of a laser).

This paste comprises three components:
a binder (for example an organic binder)
pigment
glass frit (pulverized glass)

The binder makes it possible to apply (spread) the paste. The pigment provides the contrast necessary to read the code. The glass frit is used to adhere the pigment to the glass object. During the provision of the paste on the hot glass (and immediately afterwards) the binder disappears from the mixture. Simultaneously, the frit melts and then crystallizes, thereby causing the pigment to adhere to the glass object.

During the provision of the paste, and immediately afterwards, the binder disappears from the mixture as a result of burning and decomposition, whereafter the substances formed volatize. The binder should not be burnt too vehemently to avoid the formation of cracks in the glass. If the glass is transferred to the cooling furnace, where it is first heated to 600° C. and subsequently cooled slowly to allow stresses to disappear, even more binder material disappears from the applied paste until substantially no paste remains in the mixture.

The pigment should adhere well, be scratch-resistant and exhibit sufficient contrast in the range of the lightspectrum where reading will take place. This can be, for example, the red region of the spectrum, if use is made of a customary bar code reader. It can also be the entire visible spectrum, if reading takes place with the unaided eye. Since it should be possible to recycle the glass, certain substances, for example, substances which color the glass (such as iron, manganese and sulphur) or weaken it, are preferably substantially absent from the glass. In the case of glass display tubes and front panels, there is a list of substances which must not be present in the material used to manufacture these glass display tubes and front panels. For other glass products there are other lists. For example, in glass used for bottles, specific dyes may (and sometimes must) be present; the glass used for bottles does not have to be as strong as that used for cathode ray tubes which are to be evacuated, but it is important that said glass does not contain certain toxic substances. For example, for labels for glass display tubes and front panels, use can be made of the pigment titanium dioxide. This is a white pigment which provides sufficient contrast for reading with the unaided eye or with a bar code reader. If the glass is recycled and the substance is present in diluted form in the newly made glass, it no longer has a coloring effect. Another possibility, which provides a good contrast for reading with the unaided eye, is the use of a layer which is mixed with a black pigment and which is applied on top of a layer with a white pigment, the black pigment being removed selectively. In this manner, a black code on a white background is obtained. Also the reverse is possible. If only a bar code reader is employed for reading, use can alternatively be made of a red pigment. This bar code reader is a standard product which can be easily obtained. Reading can be carried out, for example, by means of a camera, a scanner or a handscanner. Also use can be made of a pigment that changes colour when treated in a particular way. Then the code is applied by locally treating the pigment in said particular way. The colour can for instance be changed from white to black, from black to white or from red to black.

The advantage of providing objects with codes is that these objects can be monitored during the production process and after they have left the factory. During the production process, data such as day, time, press, shift, type of object, production conditions, can be encoded on the product, for example, by means of a laser. These data, or additional data, can also be recorded in a computer file, so that they can be coupled to the code on the product in an easy and unequivocal manner. An embodiment, for example, would be to read a code by means of a handscanner, whereafter information about the object is displayed on the display screen of a computer coupled to said scanner.

Monitoring individual objects during the production process and recording information about these objects can be advantageous during:

testing the effect of changes in the production process.

finding the cause of a defect in a defective object.

tracing other defective objects.

In the production process, the object, for example a glass front panel, is subjected to a number of production steps, in which the machines used are set in a specific manner. The setting of the machines influences the properties of the object. It is often desirable that these properties are substantially constant and that an optimum, with the associated tolerance, is established and maintained. For this purpose, feedback between the measured properties of the object and the setting during the sub-processes is necessary.

There are several reasons why it is advantageous to use the coding process in accordance with the invention during, for example, the production process of front panels:

the front panels can be identified very early in the process, so that the consequences of any changes in specific settings can be tested rapidly and reliably.

panels which look the same, but which have different properties can be manufactured, partly or completely, on the same production line, or they can be stored together since the type of panel can be indicated on the label.

panels can be supplied to a customer (set maker), which are provided with a code which the set maker can employ for his internal process, or a space can be left blank where the set maker can provide a code of his own.

the panels can be monitored from beginning to end with the same label.

after panels have passed through the cooling furnaces (where they can pass each other) it can be established what happened before they were introduced into said cooling furnaces.

A preferred embodiment of the invention is a label which is manufactured in the manner described in this document, and which can be provided with information by the manufacturer and the buyer of the product. In the case of glass front panels, the label can be provided on the side face of the panel. However, there is no fixed location. In order that both the manufacturer and the buyer can use the same label, arrangements must be made regarding the location of the label. It should be provided in such a manner that both the manufacturer and the buyer can readily adapt their treatment processes to said label.

What is claimed is:

1. A method of providing a glass object with label means for containing information, said label means comprising an encodable layer including glass and pigment, comprising providing a mixture of glass frit, pigment and a binder on a hot glass object, the glass object being sufficiently hot to melt the glass frit, which then crystallizes to thereby cause the pigment to adhere to the glass object, and to cause the binder to disappear, at least substantially, thereby forming said encodable layer.

2. A method of providing a glass object with information comprising encoding said information into the encodable layer of claim 1.

3. A method of claim 2, wherein the information is encoded into said encodable layer by means of laser ablation.

* * * * *